United States Patent
Stephansen

(10) Patent No.: US 11,298,880 B2
(45) Date of Patent: Apr. 12, 2022

(54) FREEZING METHOD FOR CLEANING AN ADDITIVE MANUFACTURING PART

(71) Applicant: Freemelt AB, Molndal (SE)

(72) Inventor: Robin Stephansen, Mölndal (SE)

(73) Assignee: Freemelt AB, Mölndal (SE)

( * ) Notice: Subject to any disclaimer, the term of this patent is extended or adjusted under 35 U.S.C. 154(b) by 0 days.

(21) Appl. No.: 17/041,491

(22) PCT Filed: Mar. 26, 2019

(86) PCT No.: PCT/EP2019/057624
§ 371 (c)(1),
(2) Date: Sep. 25, 2020

(87) PCT Pub. No.: WO2019/185651
PCT Pub. Date: Oct. 3, 2019

(65) Prior Publication Data
US 2021/0129438 A1    May 6, 2021

Related U.S. Application Data

(60) Provisional application No. 62/648,473, filed on Mar. 27, 2018.

(51) Int. Cl.
*B29C 64/35* (2017.01)
*B08B 3/12* (2006.01)
(Continued)

(52) U.S. Cl.
CPC ............... *B29C 64/35* (2017.08); *B08B 3/12* (2013.01); *B08B 7/0092* (2013.01);
(Continued)

(58) Field of Classification Search
CPC ................. B29C 64/35; B29C 71/009; B29C 2071/0045; B08B 3/12; B08B 7/0092; B33Y 40/20
See application file for complete search history.

(56) References Cited

U.S. PATENT DOCUMENTS 4,491,484 A * 1/1985 Williams ............... B08B 7/0092
134/17
5,025,632 A * 6/1991 Spritzer ................... B09B 3/00
241/23
(Continued)

FOREIGN PATENT DOCUMENTS

EP     3 170 568 A1    5/2017
EP     3 199 270 A1    8/2017
(Continued)

*Primary Examiner* — Sharidan Carrillo
(74) *Attorney, Agent, or Firm* — Faegre Drinker Biddle & Reath LLP

(57) ABSTRACT

The present invention relates to a method for removing powder from a component or part produced by a powder bed additive manufacturing system. The method comprises the steps; providing a part, the part having at least one internal cavity with at least one external opening, the at least one cavity being at least partly filled with powder grains, the powder grains being connected to each other and to the walls of the cavity by mechanical, frictional, electrical, physical or chemical forces; adding medium in liquid phase to the at least one cavity of the part, the liquid having the property that it expands in phase transition from liquid to solid phase; transforming added medium to solid phase to loosen and break up at least a fraction of the powder grains connections from each other; and removing powder from the at least one internal cavity.

11 Claims, 3 Drawing Sheets

(51) Int. Cl.
  *B08B 7/00*  (2006.01)
  *B29C 71/00*  (2006.01)
  *B33Y 40/20*  (2020.01)

(52) U.S. Cl.
  CPC .. *B29C 71/0009* (2013.01); *B29C 2071/0045* (2013.01); *B33Y 40/20* (2020.01)

(56) References Cited

U.S. PATENT DOCUMENTS

| | | | |
|---|---|---|---|
| 5,464,479 A | 11/1995 | Kenton et al. | |
| 2016/0236422 A1* | 8/2016 | Sakura | B08B 5/02 |
| 2017/0113253 A1 | 4/2017 | Giulietti et al. | |
| 2017/0144226 A1 | 5/2017 | Giulietti et al. | |
| 2019/0061235 A1* | 2/2019 | Bose | B29C 70/682 |
| 2021/0129438 A1* | 5/2021 | Stephansen | B08B 9/00 |

FOREIGN PATENT DOCUMENTS

| | | | | |
|---|---|---|---|---|
| GB | 2546851 A | * | 8/2017 | B08B 3/12 |
| WO | WO-2007033648 A1 | * | 3/2007 | B08B 5/00 |

\* cited by examiner

FREEZING METHOD FOR CLEANING AN ADDITIVE MANUFACTURING PART

CROSS-REFERENCE TO PRIOR APPLICATIONS

This application is a § 371 National Stage Application of PCT International Application No. PCT/EP2019/057624 filed Mar. 26, 2019, which claims priority to U.S. Provisional Application No. 62/648,473 filed on Mar. 27, 2018, both of which are incorporated herein in their entirety.

TECHNICAL FIELD

This invention relates to methods for removing remaining powder stuck inside internal cavities such as channels and passages in components produced by powder based additive manufacturing.

DESCRIPTION OF RELATED ART

For example gas turbine components are often designed with narrow, winding internal cooling cavities or channels. When such components are produced by 3D-printing or additive manufacturing, it can be difficult to remove remaining powder from inside these channels. Powder may stick inside internal cavities for many reasons; for example, if the powder has high packing density, the powder grains may simply lock each other by frictional forces. Another reason may be that the powder grains are semi-sintered to each other due to heat generated in the 3D-printing process. Yet another reason may be that the powder grains are held together by a binder agent that was added to the powder in an earlier process step.

Known methods for removing powder from internal channels are for example to use rotating tools and ultrasonic methods for separating the powder grains from each other and then transport the powder out from the channel.

US 2017/0113253 A1 discloses a method using a change of a fluid between two states of different viscosity for removal of powder from an additively manufactured article. In the document EP 3199270 A1 a method for powder removal from internal passages is described where co-built agitators are used. Further in EP 3170568 A1 a tool is described providing a cooling fluid and thermal shocks to remove conglomerated powder from an internal passage.

SUMMARY OF THE INVENTION

This invention relates to a method comprising the steps:
Providing a part, said part having at least one internal cavity with at least one external opening, said at least one cavity at least partly filled with powder grains, said powder grains being connected to each other,
Adding medium in liquid phase to said at least one cavity, said liquid having the property that it expands in phase transition from liquid to solid phase,
Transforming the added medium to solid phase to break at least a fraction of said powder grain connections,
Removing powder from said at least one internal cavity.
In embodiments, the method comprises the step: Evacuating gas surrounding said powder in said at least one cavity before adding said medium.
In embodiments, the method comprises the step: Transforming said medium from solid to liquid phase before removing powder from said at least one internal cavity.
In embodiments, the method comprises the step: Removing said medium from the part before removing powder from said at least one internal cavity.

In embodiments, the step of removing powder from said at least one internal cavity comprises removing said medium together with said powder from said at least one internal cavity.
In embodiments, said medium is water.
In embodiments, said medium is saline water.
In embodiments, said transformation of medium between liquid and solid phase is being cycled more than one cycle.
In embodiments, said powder is metal powder.
In embodiments, said powder grains are connected with bonds by sintering.
In embodiments, said powder grains are connected with bonds by semi-sintering.
In embodiments, said transformation from liquid to solid phase is performed by a temperature reduction.
In embodiments, external pressure is applied to the cavity to facilitate the step of removing of powder from the cavity.
In embodiments, ultrasonic energy is applied to facilitate the step of removing of powder from the cavity.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF DRAWINGS

In the description of the invention references is made to the following figures, in which.

Embodiments of the present disclosure and their advantages are best understood by referring to the detailed description that follows. It should be appreciated that like reference numerals are used to identify like elements illustrated in one or more of the figures.

DESCRIPTION AND DISCLOSURE OF THE INVENTION

Figure 1:
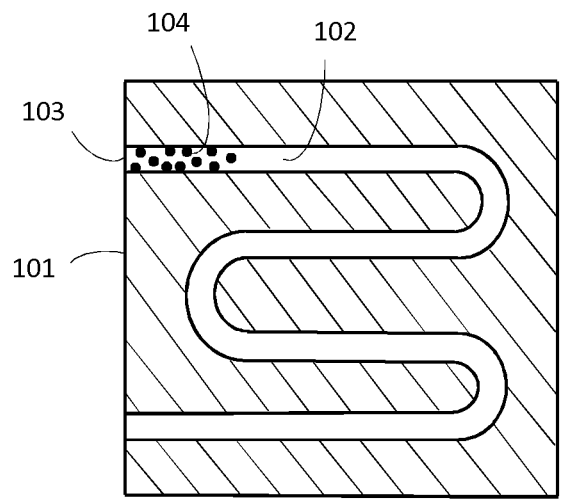
FIG. 1 shows, in schematic section view, a part having an internal cavity with an external opening.
Figure 2:
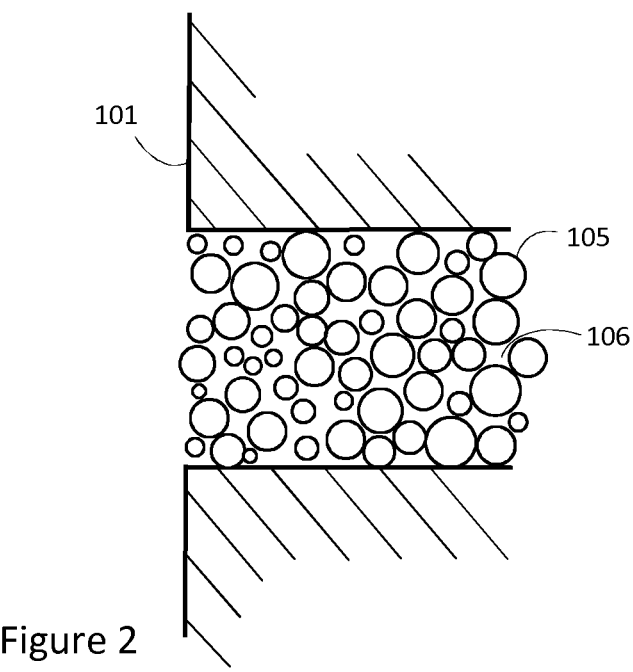
FIG. 2 shows, in schematic partial section view, a part having an internal cavity partially filled with powder having powder grains and intermediate gap volumes.

The purpose of this invention is to provide a more efficient method for removing powder from internal cavities contained in a component produced by a powder based additive manufacturing method.

The powder used for this kind of manufacturing may comprise powder grains of different size and shape. During manufacturing of a component, powder grains are fused together to solid material. The manufacturing process takes place in a powder bed, onto which powder is distributed and sequentially fused in thin layers. Thus, upon finishing the manufacturing process, the component will be embedded in powder and there will also be powder inside every internal cavity or channel inside the component. A powder grain inside a channel may be fixated by joints or contact points to other powder grains, or to an internal wall of the channel.

The powder grains both inside and surrounding the part may be connected to each other by sintering or semi-sintering from heat during the additive manufacturing process. Powder grains may also be connected to each other by shape, interlocking, geometry or friction between powder grains. In narrow cavities, powder grains may be connected to each other and also connected to the walls of the cavity and hence be difficult to remove from the cavity.

The number of contact points between powder grains may be from zero to several. The connection between powder grains in these contact points may also be of different strength. Between the powder grains there will be volume gaps normally filled with air, gas or vacuum after the 3D-print is finished, depending on the 3D-printer technology used. There will also be volume gaps between powder grains and the walls of the cavity.

Powder may stick inside internal cavities for many reasons; for example, if the powder has high packing density, the powder grains may simply lock each other by frictional forces. Another reason may be that the powder grains are semi-sintered to each other due to heat generated in the 3D-printing process. Yet another reason may be that the powder grains are held together by a binder agent that was added to the powder in an earlier process step.

To make it possible to remove the powder inside these cavities it will be of great importance to break as many contact points between powder grains as possible. It is also desired to break as many contact points between powder grains and cavity walls as possible.

This invention is based on the understanding that for example water will expand approximately 10% when it transforms from liquid to solid phase. This expansion can be used to break the forces holding powder grains together inside internal cavities to facilitate removal of the powder.

If a gap surrounded by connected or partially connected powder grains is filled with water, and this water is forced to change phase to solid phase, i.e. freezing to ice, the water will expand and break connections between powder grains. It is desired to break as many connections as possible to facilitate easy removal of powder from the channel or internal cavity.

Gaps where water is freezing earlier will have less restrictions to expand than gaps where water is freezing later, and several of the connections between powder grains surrounding these early expanding gap volumes will be broken. This is due to the fact that adjacent gap volumes still contain water in liquid phase which may dissipate out of the cavity through its external opening to make room for the expansion created by the phase transition in the gap volumes where water freezes to ice.

For a cavity containing a medium in solid form that after transformation has larger volume than the medium in liquid form, the cavity will, after solidification of the medium, not be able to contain all of the medium and powder originally located in the cavity. This means that there is a risk that the component will be put under high enough stress to crack under the pressure from the solidified medium. However, since there is at least one opening into the cavity, medium and powder will also have the possibility to eject from the cavity during the gradual solidification of the medium in the gaps. Hence, two effects will occur: 1) The medium will solidify and expand locally, thus breaking the connections between powder grains and 2) The solid medium together with powder grains will be ejected from the cavity to relieve the pressure caused by the volume expansion of the medium during the phase transformation.

To achieve an even more efficient breaking of connections between powder grains, the medium may be water with dissolved salt, for example sodium chloride (NaCl), or other solute. When saline water freezes, it will start to create solid regions of ice, i.e. water in solid phase, and the salt will propagate away from the early frozen ice regions. The effect of using saline water will make the phase transformation more extended over time, due to the fact that the salt concentration changes dynamically, so that the salt will propagate around in the cavity causing different gap volumes to freeze at different times. This effect will be advantageous for a more effective breaking of powder connections. When saline water is used as expansion medium inside the internal cavities, it may e.g. be a mix of water and sodium chloride in the range of 0.5-26%. Preferably 2-6% sodium chloride is used.

With saline water, there will be more pronounced local volumes of ice and a more in homogeneous transformation of the liquid to solid phase compared with using non-saline water.

It is realized from the above-mentioned that there are two effects breaking connections between powder grains due to phase transformation of the medium: the small scale effect and the large scale effect. The small scale effect causes connections to be broken by expansion of the small gap volumes between powder grains. The large scale effect appears when a larger volume of liquid medium is trapped in an internal cavity surrounded by frozen medium and powder grains. When this larger volume of medium solidifies there will be a macroscopic expansion. The weakest portion of frozen medium will give way for the expanding trapped medium, causing a macroscopic displacement pushing out some of the frozen media and powder grains from the cavity.

The liquid in the gap volumes or internal cavities may be frozen, i.e. transformed to solid phase, in different ways, such as e.g. by removing energy from the component, by removing energy from the liquid, by a temperature reduction, or by changing the pressure.

When breaking connections between powder grains and cavity walls as well as mutual connections between powder grains, it is possible to use repeated or cycled phase transformation of the medium in the gap volumes to increase the amount of breaking of connections. Iterating the phase transformation of the medium from liquid to solid and back from solid to liquid several times will gradually release powder grains from each other. Such cycling of phase transition can be achieved by cycling of cooling and heating of the component or the medium. It can also be achieved by cycling of the pressure in the medium.

A change of the pressure in the medium can have two effects; changing phase of the medium, and helping pushing and pressing the powder and medium out from the internal cavity or channel. In the case where the temperature or the pressure in the medium is cycled, new medium can be fed into the cavity if medium is lost due to medium and powder being pushed out from the cavity.

An embodiment of this invention is shown in FIGS. 1, 2, 3 and 4. A method is disclosed for a part or component 101 produced with additive manufacturing. The part 101 has an internal cavity or channel 102 with at least one external opening 103. The cavity 102 is at least partly filled with metal powder 104 with grains 105 connected to each other. A possibility for facilitating introduction of medium into narrow cavities 102 is to evacuate gas surrounding the powder in the cavity 102 before adding the medium. There are gap volumes 106 between the metal powder grains 105, which may be evacuated from gas by a pump, fan or by means of placing the part 101 in a vacuum chamber. Typical pressure levels for the remaining gas after evacuation may be 0.99-0.1 bar or $0.1 \cdot 10^{-2}$ bar or $10^{-2}$-$10^{-10}$ bar.

Medium 107, in liquid phase, is added by introducing the medium 107 into the gaps 106 in the cavity 102. The medium may be water, saline water, water with other solutes, acetic acid, or other medium having significant expansion when transformed from liquid to solid phase. For a component 101 kept in air (or other gas), if the cavity 102 has small dimensions and is filled with powder grains 105, it may be difficult to completely fill the cavity 102 with a liquid medium 107. Since air (or gas) pressure is the same inside the cavity 102 as outside the cavity 102, there is no pressure difference pushing liquid medium 107 into the cavity 102.

Figure 3:
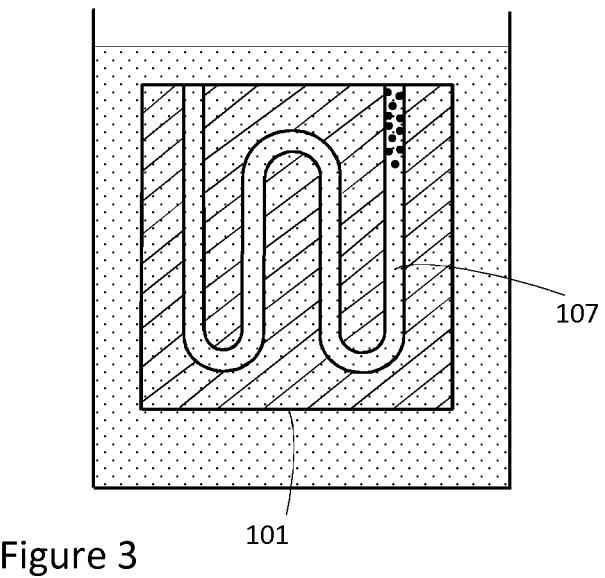
FIG. 3 shows, in schematic partial section view, a part submerged in a medium.
Figure 4:
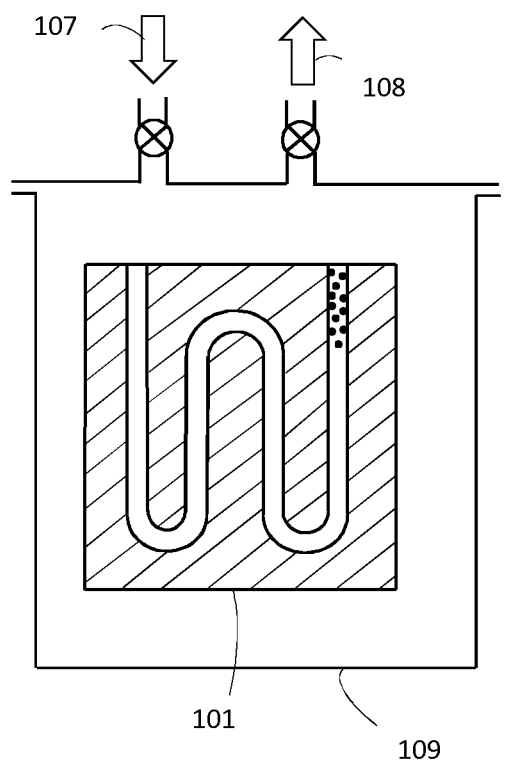
FIG. 4 shows, in schematic partial section view, a part enclosed in a vacuum chamber.
Figure 5:
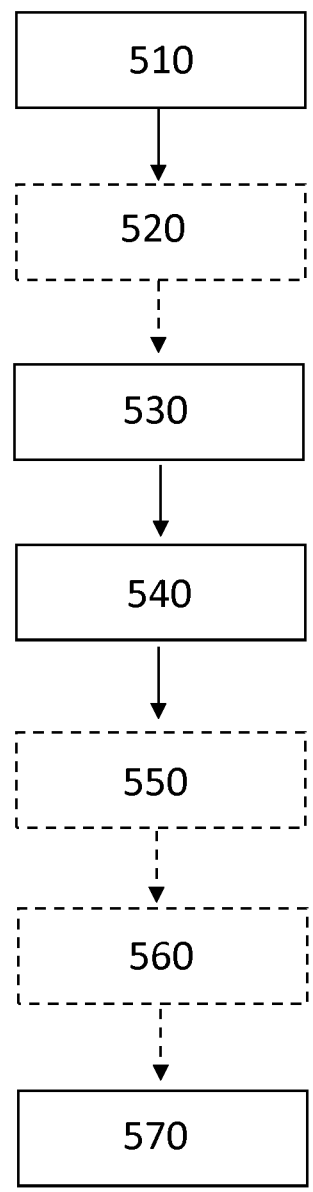
FIG. 5 shows, a block diagram over the steps in the method.

Submerging the part 101 in the liquid medium 107 is one way of filling the cavity 102 with the liquid medium 107, shown in FIG. 3. However, surface tension of liquid mediums 107 such as e.g. water will effectively prevent the liquid medium 107 from completely filling all gaps 106 in the cavity 102. There will also be a counterpressure from the air (or gas) inside the cavity 102, hindering complete filling of the cavity 102 by the medium 107. Thus, there is a risk that pockets of air (or gas) remain inside the cavity 102. This problem may be solved by enclosing the part 101 in a vacuum chamber 109, which is evacuated from gas 108, shown in FIG. 4. Thereafter the vacuum chamber 109 is at least partly filled with liquid medium 107 by opening a valve between the vacuum chamber 109 and a container with liquid medium 107. In this at least partly fillup of the vacuum chamber 109 with the medium 107 in liquid phase, the part 101 becomes completely submerged in the medium 107 in liquid phase. Since there is vacuum inside the cavity 102 before the fillup of liquid medium 107, there is no counterpressure and the medium 107 will penetrate easier into the cavity 102. The vacuum chamber 109 is subsequently ventilated to atmospheric pressure of air (or gas), creating a pressure difference between remaining unfilled gaps 106 in the cavity 102 and the outside of the liquid medium 107, being at atmospheric pressure. This pressure difference will effectively drive the liquid medium 107 into the internal cavity 102, and all remaining unfilled gaps 106 will thus be completely filled by the medium 107. The added liquid 107 has the property that it expands in phase transition from liquid to solid phase, an may for example be water, saline water, or vinegar. The completeness in filling the cavity 102 with the liquid medium 107 is important for the efficiency of breaking the metal powder grain connections in the following step of phase transformation and volume expansion of the medium.

To further increase the completeness of filling the cavity 102 with liquid medium 107, it may be advantageous to remove dissolved gas from the liquid medium 107 prior to filling the liquid medium 107 into the cavity. A liquid like water, for example, may contain a significant amount of dissolved air at room temperature. The solubility of gas in water decreases with temperature and increases with pressure. Thus, an efficient method to remove dissolved gas from water is to heat up the water to boiling temperature. Another efficient method to remove dissolved gas from water is to put the water in a closed container and evacuate the gas volume surrounding the water. Both methods will result in degassing of the water. The purpose of using a degassed medium for filling the cavity is to reduce the risk that pockets of gas are formed inside the cavity 102 after filling with medium 107.

In the next step of the embodiment, the added liquid medium 107 is transformed to solid phase for breaking at least a fraction of the metal powder grain connections. This phase transformation is achieved by cooling down the part 101 and the medium 107. The cooling can be done by placing the part 101 together with the medium 107 in a freezer. The cooling can also be done by submerging the part 101 together with the medium 107 in liquid nitrogen. Alternatively a cooling block can be clamped to the part 101 for achieving a phase transformation of the medium 107. During transformation of the medium 107 from liquid to solid phase, the medium 107 will expand and cause breaking of connections between metal powder grains 105 for easier removal of remaining powder 104. Thereafter the part 101 and medium 107 is heated for transformation of the solid medium 107 back to liquid phase. This heating may be done by placing the part 101 and the medium 107 in an oven or simply by placing the part 101 and the medium 107 in room temperature. Alternatively, the part 101 with solid medium 107 may be submerged in a heated fluid for phase transformation of the medium in the cavity to liquid phase. In the next step, the medium 107 and the metal powder 104 is removed from the internal cavity 102. Medium 107 in liquid phase can be removed together with metal powder 104 from the part, or medium 107 in liquid phase can be removed in a first step and the remaining powder 104 can be removed in a second step from the part 101. This removal may be done in different ways, for example by applying pressure to the medium inside the cavity; this pressure may be varied by cycling or pulsing to achieve a good removal of powder 104. It is also possible that the remaining powder grains 105 may be poured from the internal cavity 102 simply by tilting the part 102 in different angles when a significant amount of connections between powder grains 105 have been broken.

In order to remove the medium 107 from the internal cavity 102, the medium 107 can be transformed from solid phase back to liquid phase and further transformed to gas phase for facilitating the removal of the medium 107.

In another embodiment, the powder 104 is removed from the cavity 102 when the medium 107 is in solid phase or partly in solid phase. The transformation of medium 107 between liquid and solid phase may also be cycled by alternating between freezing and melting of the medium 107. It is also possible to use a condition where a portion of the medium 107 is in a solid phase and another portion of the medium 107 is in a liquid phase. Such a condition of mix of liquid and solid, also called slurry or slush, may be used with or without cycling of the phase transformation.

In yet other embodiments it is also possible to combine the described method with applying external pressure to the cavity 102 or ultrasonic energy to facilitate removing of powder 104 from the cavity 102. When the internal cavity 102 is filled with fluid 107, an external pressure may be applied to the external opening 103 for forcing the powder 104 (and fluid 107) out from the internal cavity 102. This external pressure may also be pulsed, to achieve an improved removing effect. Further, ultrasonic energy may be applied to the fluid 107 surrounding the part 101, when said part 101 is submerged in fluid 107. Ultrasonic energy may also be applied in direct contact with the part 101 for efficient energy transfer.

Other methods for removing of powder 104 from the cavity 102 can be to combine the described invention with the use of ultrasonic cleaning, mechanical removing of powder by means of tools, etc.

An object of this invention is to provide a method for removing sintered powder from internal cavities of an object produced by additive manufacturing. This object is achieved by the method defined in the independent claim. The dependent claims contain advantageous embodiments, variants and further developments of the invention.

What is claimed is:

1. A method comprising:
providing a part, said part having at least one internal cavity with at least one external opening, said at least one cavity being at least partly filled with powder grains, said powder grains being connected to each other;
adding medium in liquid phase to said at least one cavity, said liquid having the property that it expands in phase transition from liquid to solid phase, wherein said medium is saline water;
transforming the added medium to solid phase to break at least a fraction of said powder grain connections; and
removing powder from said at least one internal cavity.

2. The method according to claim 1, further comprising transforming said medium from solid to liquid phase before removing powder from said at least one internal cavity.

3. The method according to claim 1, further comprising removing said medium from the part before removing powder from said at least one internal cavity.

4. A method according to claim 1, wherein removing powder from said at least one internal cavity comprises removing said medium together with said powder from said at least one internal cavity.

5. The method according to claim 1, wherein said transformation of medium between liquid and solid phase is being cycled more than one cycle.

6. The method according to claim 1, wherein said powder is metal powder.

7. The method according to claim 1. wherein said powder grains are connected with bonds by sintering.

8. The method according to claim 1, wherein said transformation from liquid to solid phase is performed by a temperature reduction.

9. The method according to claim 1. wherein external pressure is applied to the cavity to facilitate removing the powder from the cavity.

10. The method according to claim 1, wherein ultrasonic energy is applied to facilitate removing the powder from the cavity.

11. The method according to claim 1, further comprising evacuating gas surrounding said powder in said at least one cavity before adding said medium.

* * * * *